United States Patent [19]
Manzo et al.

[11] Patent Number: 5,562,242
[45] Date of Patent: Oct. 8, 1996

[54] DEVICE FOR VIBRATION WELDING

[75] Inventors: Alain Manzo; Jean L. Janin, both of Fillinges, France

[73] Assignee: Mecasonic S.A., Annemasse Cedex, France

[21] Appl. No.: 359,474

[22] Filed: Dec. 20, 1994

[30] Foreign Application Priority Data

Dec. 27, 1993 [FR] France .................................. 93 15697

[51] Int. Cl.⁶ .................................................. B29C 65/06
[52] U.S. Cl. ........................... 228/2.1; 156/580; 156/73.5
[58] Field of Search ................... 228/2.1, 112.1; 156/73.5, 580

[56] References Cited

U.S. PATENT DOCUMENTS 3,920,504  11/1975  Shoh et al. ........................... 228/2.1 X

FOREIGN PATENT DOCUMENTS

| 1080943 | 3/1984 | U.S.S.R. .................................. 228/2.1 |
| 2184197 | 6/1987 | United Kingdom . |
| 2189654 | 10/1987 | United Kingdom . |

Primary Examiner—Kenneth J. Ramsey
Attorney, Agent, or Firm—Pollock, Vande Sande & Priddy

[57] ABSTRACT

Device for causing epicycloid vibration, characterized in that it comprises at least one shaft secured by one of its ends to a bed connected by elastic means to the frame of the machine and furthermore supporting a thermoplastic component, the said shaft being provided at this end with a magnetic outgrowth, which when made to rotate inside a plurality of magnetic fields brought about by switching on a plurality of electromagnets located about the said shaft, generates an epicycloid-type movement of the bed, the other free end of the shaft being, on the one hand, guided in rotation within the frame of the machine and, on the other hand, driven in rotation by a motor.

13 Claims, 2 Drawing Sheets

DEVICE FOR VIBRATION WELDING

FIELD OF THE INVENTION

The present invention relates to a device for vibration welding, particularly of the epicycloid type, with a view to allowing the assembly of thermoplastic components, particularly those coming from the toy, electrical household appliance, aeronautical, automobile industries, etc.

BACKGROUND OF THE INVENTION

Linear vibration welding devices are known in which the thermoplastic components are placed on a bed wherein the movement described is reciprocating translation in a preferred direction. The bed is generally moved by hydraulic or electromagnetic means powered by an AC voltage; nevertheless, these devices, owing to the kinematics which they have to impart to the component to be welded, require that at a given moment corresponding to an extremum in the trajectory, the speed of the moving body, which was non-zero and of given amplitude and direction a few minutes beforehand, cancels out, changes direction, and reaches a similar amplitude in terms of absolute value to the previous one, which involves variations in the operation and energy usage of the device; a fraction of the energy expended is downgraded as the bed slows down, and this results in heterogeneity of the weld bead, the fusion temperature reached not being uniform along the weld bead especially when the latter is not orientated in a direction parallel to the movement of travel of the bed.

The present invention therefore aims to overcome these drawbacks by providing a device which makes use of the advantages of the modes of orbital vibration; indeed, according to this mode of vibration, the modulus of the speed remains practically constant over the entire trajectory, the changes in direction taking place progressively and continuously; moreover, this mode of vibration allows complex trajectories combining planar rotation and translation-best corresponding to the convolutions of the joining lines.

For this purpose, the device for causing epicycloid vibration is characterized in that it comprises at least one shaft secured by one of its ends to a bed connected by elastic means to the frame of the machine and furthermore supporting a thermoplastic component, the said shaft being provided at this end with a magnetic mass, which when made to rotate inside a plurality of magnetic fields brought about by switching on a plurality of electromagnets located about the said shaft, generates an orbital-type movement of the bed, the other free end of the shaft being, on the one hand, guided in rotation within the frame of the machine and, on the other hand, driven in rotation by a motor.

Other features and advantages of the present invention will emerge from the description given below with reference to the appended drawings which illustrate one embodiment thereof which is devoid of any limiting nature. In the figures:

DETAILED DESCRIPTION OF THE INVENTION

Figure 1:
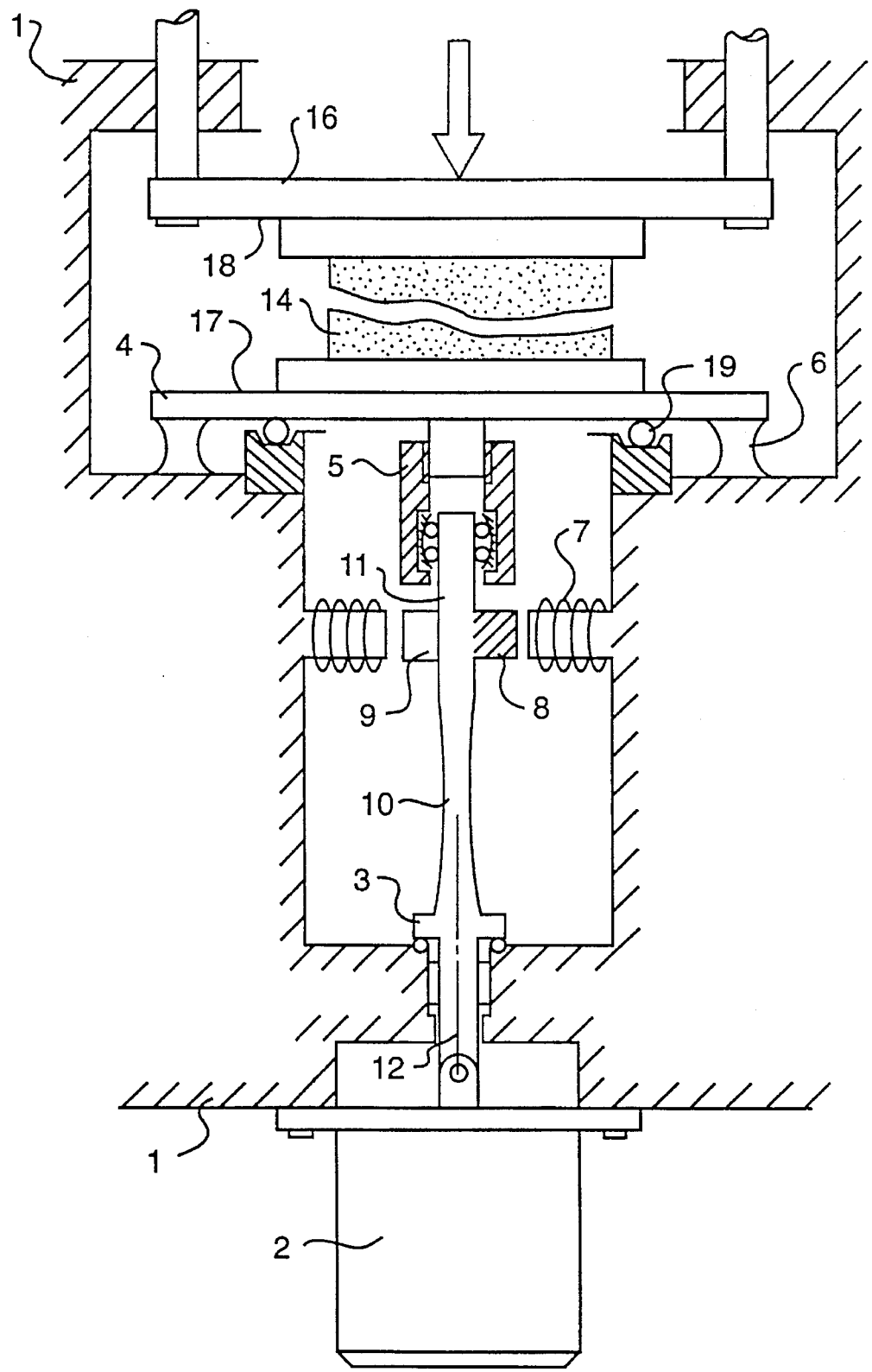
FIG. 1 is a plane view in section of a machine equipped with an epicycloid vibration device.
Figure 2:
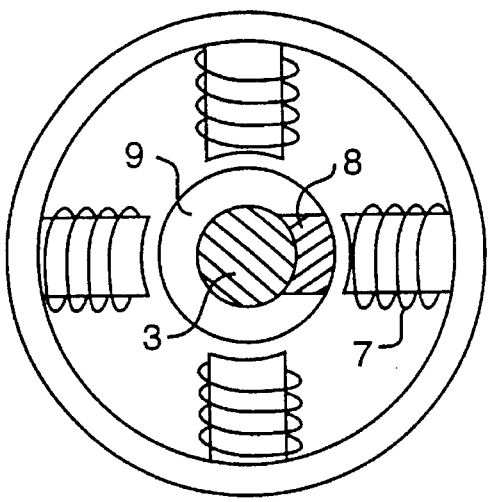
FIG. 2 is a plane sectional view of the windings at the cutting plane A—A.
Figure 3:
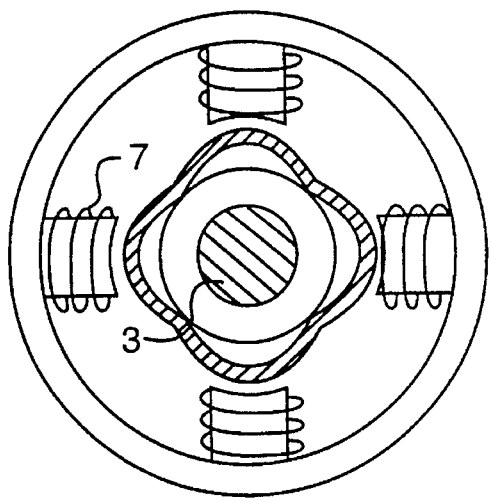
FIG. 3 illustrates the movement of the bed, when the windings are powered.

According to a preferred embodiment of a machine including the device for causing vibration according to the invention, it is equipped, at any point on its frame 1, with an electric motor 2, particularly of the asynchronous, series or DC type, driving a shaft 3 secured to a bed 4.

According to another preferred embodiment, another type of power motor, particularly of the pneumatic or hydraulic etc. type is substituted for the electric motor 2.

The link between the bed 4 and the shaft 3 is achieved using a coupling member 5, particularly of the ball-joint or cardan joint type, combined with a member allowing the shaft to translate along its axis, especially of the guide bushing type; this link converts the epicycloid movement coming from the rotation of the motor shaft 3 and from the orbit generated by the magnetic attraction into a combination of translational movements in the plane of the bed 4. The bed 4 is also secured to the frame 1 of the machine using a plurality of elastic coupling blocks 6, generally consisting of shock mounts, or elastic members of the spring sort. The bed 4 is kept parallel to the plane of the frame 1 by guide stops 19 allowing any movement in the plane perpendicular to the axis of rotation of the motor and opposing any force applied along this axis by the bed 16. The kinematics thus achieved between the bed 4 and the shaft 3 of the motor guarantees that when the latter is rotating, it generates a vibration of the bed 4, one of the material points of which describes a curve of the epicycloid type, in which the number and amplitude of the antinodes is a function of the number of windings on electromagnets 7 that are switched on.

The shaft 3 is provided, at its end and close to the bed/shaft junction, with an outgrowth 8 which is produced in a magnetic material, particularly in ferrite or in a laminated material. The length of this shaft 3 is sufficiently great for it to be possible to make use of its deflection when it is subjected to radial influences. Opposite this outgrowth 8, a non-magnetic mass 9 is secured using known means to the shaft 3, overall on the same diameter as the magnetic component, in order to counteract, on the one hand, the imbalance which is created when the shaft 3 is made to rotate and, on the other hand, parasitic vibration.

According to another feature of this shaft 3, it has at least one longitudinal zone 10 of lesser cross-section extending between its end 11 linked to the vibrating bed 4 and its end 12 secured to the drive member.

According to another embodiment of a machine equipped with an epicycloid vibration device, provision is made for the motor 2 not to be placed directly along the axis of the shaft 3 but to be connected to the latter via a plurality of transmission members, particularly of the belt and pulley type (which are not represented in the figures), connected together and transmitting the rotational movement coming from the motor 2 to the shaft 3 secured to the bed 4.

Provision is also made for locating a plurality of electromagnets 7 subjected to a DC voltage on the frame 1 of the machine and facing the zone covered by the magnetic outgrowth 8 when the latter describes a complete revolution.

Thus, when voltage is applied, the passing of the current through the winding creates an induced magnetic field which, when the magnetic outgrowth 8 passes through it, attracts the end 11 of the shaft 3 in the direction of the core, thereby causing a radial influence in the form of buckling of the shaft linked to the bed 4. When this phenomenon is repeated as many times as there are electromagnets 7 subjected to a DC voltage, a point situated at the periphery of the rotating shaft 3 describes an undulatory movement. The mechanical characteristics of the shaft 3, in particular its rigidity, allow it to tend towards its position of rest between two radial influences. This phenomenon of return to a position of stability is amplified by the centripetal force which depends on the rotational speed of the motor 2.

The movement imparted to the shaft 3 of the motor is transmitted to the bed 4 and consequently to the supported thermoplastic component 14 which is secured to it by known means such as, particularly, machining fixtures, clamping, moulding, etc.

The amplitude and trajectory of the bed 4 which are some of the main determinant parameters for the quality of the fusion of material thus brought about, may be adjusted as a function of the number and choice of combination of the electromagnets 7 switched on, of the electrical energy applied to these, of the speed of rotation of the shaft 3. Moreover, breaking the field of attraction ipso facto causes the shaft 3 to return to a neutral position.

Figure 5:
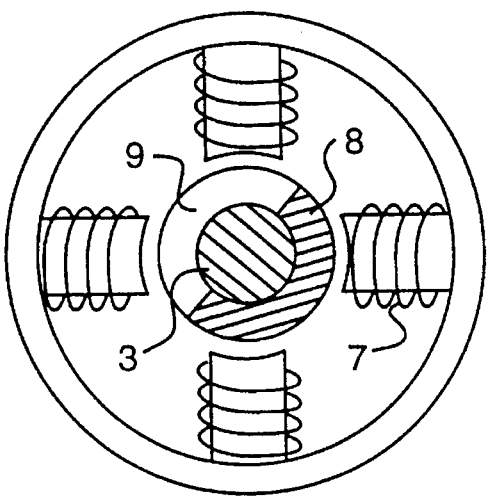
FIG. 5 is a plane sectional view of the windings including another embodiment of the magnetic outgrowth.

According to another embodiment, the outgrowth 8 forming the movable magnetic core may be likened to a sector of variable dimension which, at a given moment, allows the magnetic field of one or more electromagnets 7 to be embraced simultaneously (cf. FIG. 5).

Figure 6:
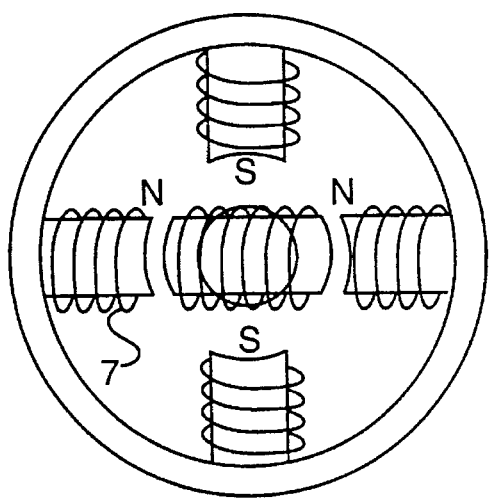
FIG. 6 is a plane sectional view of the windings including another embodiment of the magnetic outgrowth in the form of an electromagnet.
Figure 4:
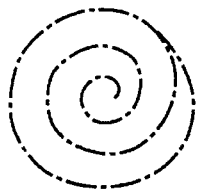
FIG. 4 represents the trajectory of a point of the bed, in the transient star-up phase.

According to another embodiment, the outgrowth 8 forming the movable magnetic core is an electromagnet powered via a connection which allows rotation, particularly of the brush or slip ring type and generating a combination of attraction and repulsion forces depending on the polarity of the coinciding magnetic masses (cf. FIG. 6).

According to another embodiment, the shaft 3 may consist of two separate parts, one of which is secured to the bed 4 and the other secured to the shaft of the motor 2, these parts being joined together by an elastic coupling, particularly a combination of a cardan joint with a spring.

The frame 1 of the machine also includes another bed 16 arranged substantially facing the oscillating bed 4. The second bed 16 is guided in translation, but cannot turn in rotation, in a direction parallel to the perpendicular axis of the oscillating bed 4. The inter-bed space thus created makes it possible to insert the two thermoplastic components of variable height between the upper face 17 of the oscillating bed 4 and the lower face 18 of the second bed 16.

The second bed 16 is subjected, by known means such as, particularly, rams, springs, cams, etc., during welding operations, to a pressure force which is exerted perpendicularly relative to the surface of the bed.

The invention as previously described generates numerous advantages:

the deformation of the axis of revolution without mechanical contact does not involve any wear and involves practically no maintenance;

the powering of the windings with DC voltage eliminates the complexity connected with variable-frequency power;

adjusting the rubbing speed between the two components to be assembled is a function only of the speed of rotation of the drive shaft and of the number of electromagnets switched on;

fusion is initiated along a Corriolis curve and meets an epicycloid curve guaranteeing high weld quality;

breaking the magnetic field halts the welding operations.

It remains clearly understood that the present invention is not limited to the embodiments described and represented hereinabove, but that it encompasses all variants thereof.

We claim:

1. A welding apparatus for orbitally vibrating a thermoplastic component and comprising:

a frame;

at least one shaft having first and second ends;

rotational driving means connected to the first end of the shaft;

means connected to the frame and contacting the shaft to guide rotation of the shaft;

a second end of the shaft connected to a component support bed;

elastic means connecting the bed to the frame;

a magnetic projection extending from an intermediate point of the shaft;

a plurality of electromagnetic means mounted to the frame, around the shaft and extending in registry with the projection, for driving the shaft and connected bed in epicycloid motion when electromagnetic fields from the electromagnets are switched on.

2. The apparatus set forth in claim 1 further comprising:

a joint connected between the rotational driving means and the shaft.

3. The apparatus set forth in claim 1 wherein the guide further comprises a bushing that coaxially receives the shaft.

4. The apparatus set forth in claim 1 wherein the projection further comprises a metallic material; and further wherein the shaft is sufficiently long to cause a predetermined minimum deflection when subjected to radial electromagnetic fields.

5. The apparatus set forth in claim 1 wherein the projection further comprises a non-magnetic mass connected to the shaft and counterweighing the magnetic projection in response to parasitic vibration and imbalance created when the shaft undergoes rotation.

6. The apparatus set forth in claim 1 wherein the shaft further comprises at least one longitudinal intermediate section of reduced cross section that facilitates shaft deformation.

7. The apparatus set forth in claim 1 wherein the rotational driving means further comprises a plurality of transmission members connected between the shaft and a motor.

8. The apparatus set forth in claim 1 wherein the rotational driving means further comprises a motor and a plurality of shafts secured to at least one bed.

9. The apparatus set forth in claim 1 further comprising a clutch interposed between the shaft and a motor to permit the motor to run continuously, independently of a component welding cycle.

10. The apparatus set forth in claim 1 wherein the projection is a magnetic core serving as a sector of variable dimension during vibration that, at a given moment, allows interaction of electromagnetic fields generated by the electromagnets.

11. The apparatus set forth in claim 1 wherein the projection is an electromagnet powered by a rotational coupling generating attraction and repulsion forces depending on the polarity of coinciding magnetic masses.

12. The apparatus set forth in claim 1 wherein the shaft further comprises two separate parts, a first of which is secured to the bed, and the other secured to a drive shaft of the rotational driving means, the separate parts joined by an elastic coupling.

13. The apparatus set forth in claim 1 wherein the electromagnets are powered by direct current.

* * * * *